(12) United States Patent
Soon

(10) Patent No.: US 6,419,602 B1
(45) Date of Patent: Jul. 16, 2002

(54) DERAILLEUR CABLE ROUTER WITH A CABLE HOUSING SUPPORT THAT PIVOTS IN MULTIPLE DIRECTIONS

(75) Inventor: Yeo Yong Soon, Singapore (SG)

(73) Assignee: Shimano (Singapore) Private Limited, Singapore (SG)

( * ) Notice: Subject to any disclaimer, the term of this patent is extended or adjusted under 35 U.S.C. 154(b) by 0 days.

(21) Appl. No.: 09/537,593

(22) Filed: Mar. 28, 2000

Related U.S. Application Data

(62) Division of application No. 09/259,152, filed on Feb. 26, 1999, now Pat. No. 6,135,905.

(51) Int. Cl.[7] .............................. F16H 9/06; F16H 59/00
(52) U.S. Cl. ................................................. 474/80
(58) Field of Search .......................... 474/78, 80, 82; 248/125.2, 332

(56) References Cited

U.S. PATENT DOCUMENTS

| | | | | |
|---|---|---|---|---|
| 4,384,864 A | * | 5/1983 | Bonnard | 474/82 |
| 4,437,848 A | * | 3/1984 | Shimano | 474/80 |
| 4,470,823 A | * | 9/1984 | Shimano | 474/82 |
| 4,838,837 A | * | 6/1989 | Testa | 474/80 |
| 5,358,451 A | * | 10/1994 | Lacombe et al. | 474/80 X |
| 5,624,334 A | | 4/1997 | Lumpkin | 474/79 |
| 5,904,629 A | * | 5/1999 | Oka | 474/82 X |
| 6,287,228 B1 | * | 9/2001 | Ichida | 474/82 |

FOREIGN PATENT DOCUMENTS

| | | | |
|---|---|---|---|
| DE | 3440066 A1 | * | 5/1986 |
| EP | 850828 A2 | | 7/1998 |
| EP | 878385 A2 | | 11/1998 |

* cited by examiner

*Primary Examiner*—David A. Bucci
*Assistant Examiner*—Colby Hansen
(74) *Attorney, Agent, or Firm*—James A. Deland

(57) ABSTRACT

A derailleur cable router is provided for changing the direction of a derailleur cable having a cable housing surrounding at least a portion of the derailleur cable. The derailleur cable router includes a base member, a pulley mounted on the base member for rotation around a pulley axis, and a housing support movably supported on the base member. The housing support pivots relative to the pulley around a first axis and a second axis, wherein the first axis is different from the second axis.

8 Claims, 3 Drawing Sheets

DERAILLEUR CABLE ROUTER WITH A CABLE HOUSING SUPPORT THAT PIVOTS IN MULTIPLE DIRECTIONS

CROSS REFERENCE TO RELATED APPLICATIONS

This application is a division of application Ser. No. 09/259,152, filed Feb. 26, 1999, now U.S. Pat. No. 6,135,905.

BACKGROUND OF THE INVENTION

The present invention is directed to control devices for bicycle transmissions and, more particularly, to a bicycle derailleur that includes a derailleur cable router for changing the direction of a derailleur cable.

U.S. Pat. No. 5,624,334 discloses one type of derailleur cable router for changing the direction of a derailleur cable having a cable housing surrounding at least a portion of the derailleur cable. In the derailleur cable router disclosed in that patent, a pulley is mounted to a frame for rotation around a pulley axis. The frame includes a first leg extending radially from the pulley axis for supporting the cable housing and a second leg extending radially from the pulley axis for supporting a derailleur interface member. The derailleur interface member slidingly and detachably engages a cable feed formed on the base member of the derailleur at the rear of the derailleur so that the cable router can deflect in response to external forces.

Because the derailleur cable router is an add-on part coupled to the rear of the derailleur, the derailleur cable router forms a relatively large appendage which increases the bulk of the derailleur and also creates more surface area that can be subjected to undesirable external forces. Also, since the derailleur cable router is detachably coupled to the derailleur, there is a risk that the derailleur cable router can become dislocated from the derailleur when a sudden force is applied to the pulley or frame. Such dislocation also could occur as a result of rotation of the derailleur during operation of the derailleur.

Thus, it is desirable to make a derailleur cable router that is more compact to minimize the surface area that could be subjected to undesirable external forces. It is also desirable to make a derailleur cable router that can accommodate lateral deflection caused by external forces applied to the cable router as well as deflection caused by rotation of the derailleur during operation of the derailleur, all without dislocating from the derailleur.

SUMMARY OF THE INVENTION

The present invention is directed to a derailleur cable guide router which is very compact and which accommodates lateral deflection caused by external forces applied to the cable router as well as deflection caused by rotation of the derailleur during operation of the derailleur, all without dislocating from the derailleur. In one embodiment of the present invention, a derailleur cable router is provided for changing the direction of a derailleur cable having a cable housing surrounding at least a portion of the derailleur cable. The derailleur cable router includes a base member, a pulley mounted on the base member for rotation around a pulley axis, and a housing support movably supported on the base member. The housing support pivots relative to the pulley around a first axis and a second axis, wherein the first axis is different from the second axis.

In a more specific embodiment, the first axis extends in a direction substantially parallel to the pulley axis, and the second axis extends in a direction substantially perpendicular to the pulley axis. Thus, rotation of the housing support around the first axis accommodates deflection caused by rotation of the derailleur during operation of the derailleur, and rotation of the housing support around the second axis accommodates lateral deflection caused by external forces applied to the cable router.

If the base member of the derailleur cable router also functions as the base member for the derailleur, then the resulting structure is very compact and does not form a large appendage to the derailleur. In that case the pivoting housing support is all that is necessary to accommodate deflection caused by rotation of the derailleur during operation of the derailleur and lateral deflection caused by external forces applied to the cable router.

DETAILED DESCRIPTION OF THE EMBODIMENTS

Figure 1:
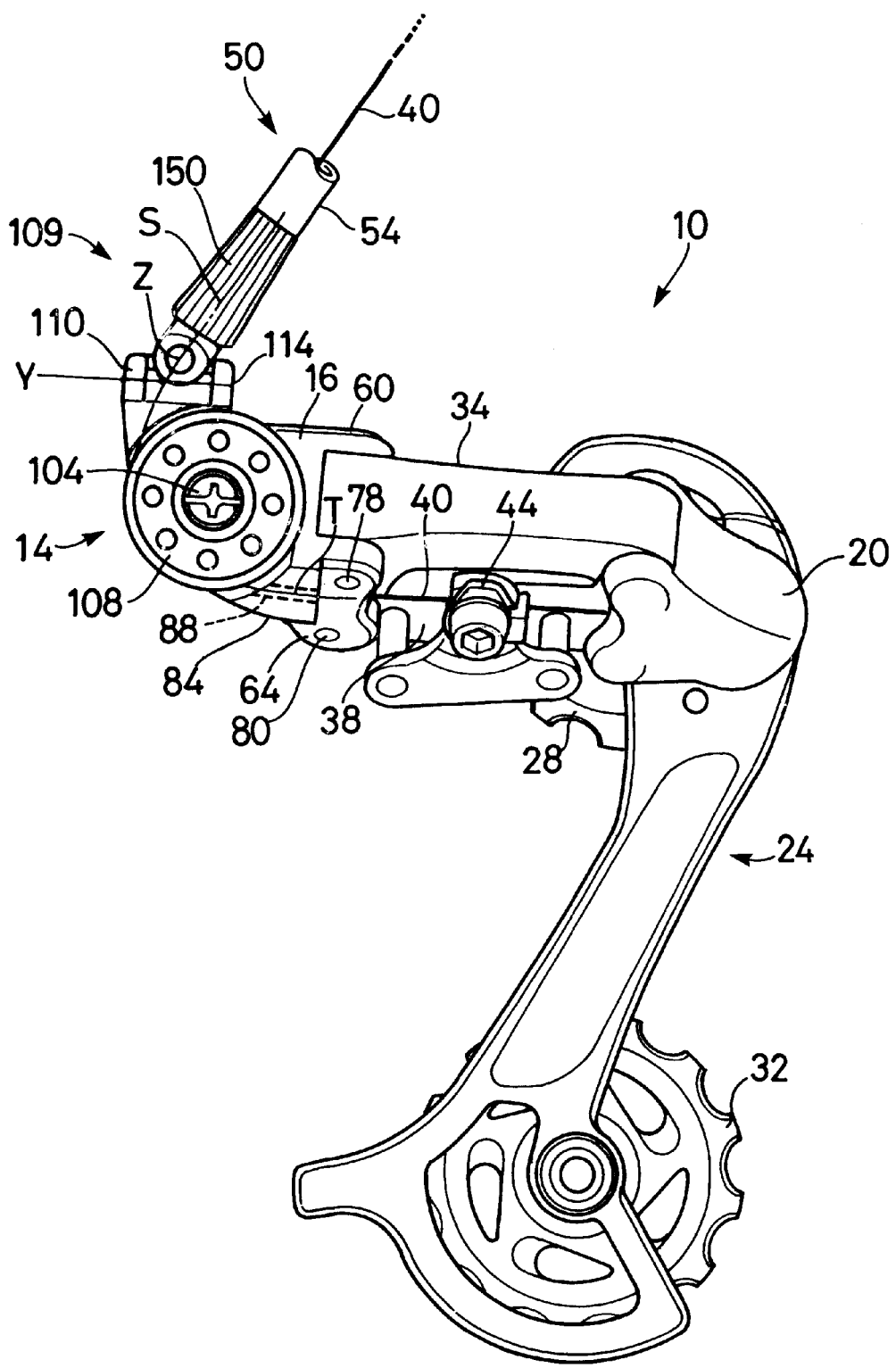
FIG. 1 is a side view of a particular embodiment of a derailleur incorporating a derailleur cable router according to the present invention.

FIG. 1 is a side view of a particular embodiment of a derailleur 10 incorporating a derailleur cable router 14 according to the present invention. Derailleur 10 includes a base member 16 that also functions as a base member for derailleur cable router 14; a movable member 20 supporting a typical chain guide 24 having a guide pulley 28 and a tension pulley 32; and coupling members in the form of links 34 and 38 for coupling movable member 20 to base member 16. Movable member 20 moves relative to base member 16 in a known manner in response to pulling and releasing a derailleur cable 40 attached to a clamp 44 fixed to link 34. Derailleur cable 40 is part of an overall derailleur control cable 50 of the Bowden type wherein a cable housing 54 surrounds at least a portion of the derailleur cable 40.

Figure 2:
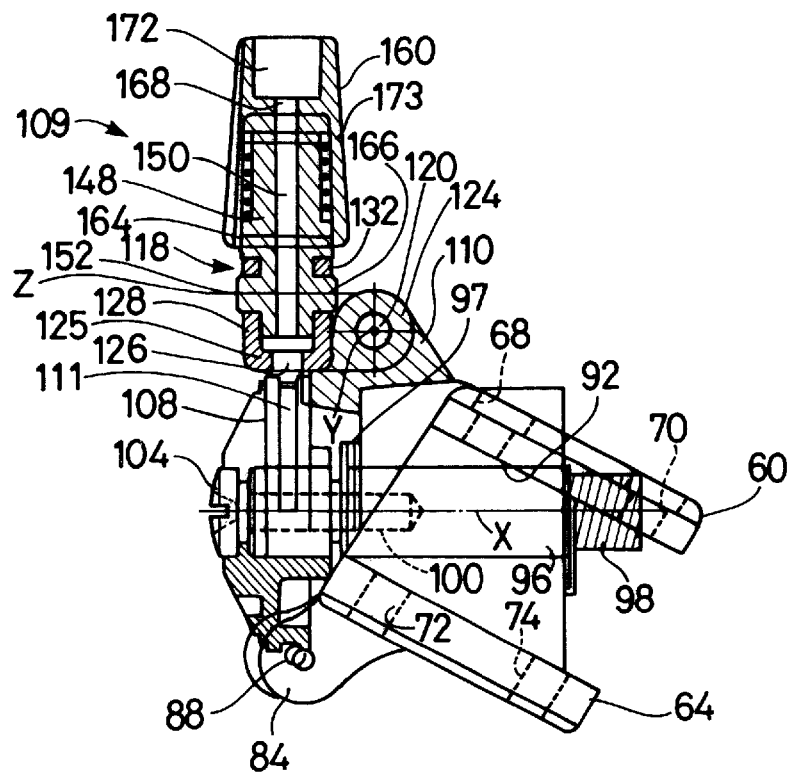
FIG. 2 is a partial cross-sectional view of the derailleur cable router shown in FIG. 1.

As mentioned above, base member 16 of derailleur 10 also functions as a base member for derailleur cable router 14. As shown in FIGS. 1 and 2, base member 16 includes opposed link coupling members 60 and 64 with link coupling openings 68, 70, 72 and 74 for receiving link coupling pins 78 and 80 that couple links 34 and 38 to base member 16. A cable feed 84 defining a cable channel 88 is integrally formed as one-piece with base member 16 for receiving derailleur cable 40 therethrough and for guiding cable 40 to clamp 44. Base member 16 also includes an opening 92 for receiving a derailleur mounting bolt 96 therethrough, wherein derailleur mounting bolt 96 has a tool-receiving head 97 and a threaded end 98 for mounting derailleur 10 to the bicycle frame (not shown) so that base member 16 rotates around derailleur mounting bolt 96. A spring (not shown) preferably is mounted within opening 92 around derailleur mounting bolt 96 in a well-known manner, such as that shown in U.S. Pat. No. 4,690,663, incorporated herein by reference, for biasing base member 16 in a clockwise direction to help position guide pulley 28 in the proper position relative to the sprockets (not shown) mounted to the rear wheel of the bicycle (not shown). A similar spring (not shown) is mounted within movable member 20 for biasing chain guide 24 in the clockwise direction in a well-known manner.

A threaded opening 100 is formed in derailleur mounting bolt 96 for threadingly engaging a pulley mounting bolt 104. Pulley mounting bolt 104 mounts a pulley 108 with a cable entraining groove 111 to base member 16 so that pulley 108 rotates around a pulley axis X that is concentric with derailleur mounting bolt 96 and opening 92. A suitable bearing (not shown) may be used to facilitate rotation of pulley 108 around pulley mounting bolt 104, if desired. As shown in FIG. 1, pulley 108 is exposed, but a housing could be formed around pulley 108 to protect pulley 108 from dirt, water and other contaminants, if desired.

Figure 3:
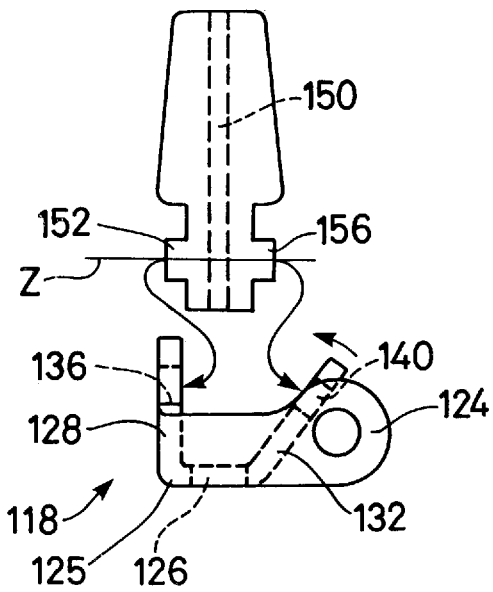
FIG. 3 shows how a housing coupling member is assembled to a base coupling member.

A housing support 109 comprising a base coupling member 118, a housing coupling member 148 and a tension adjusting barrel 160 is provided for supporting cable housing 54 relative to pulley 108 and for guiding derailleur cable 40 to cable entraining groove 111 on pulley 108. More specifically, a pair of spaced-apart and opposed coupling flanges 110 and 114 are formed as one piece with and extend from base member 16 for pivotably mounting base coupling member 118 to base member 16 through a pivot pin 120. As shown in FIGS. 2 and 3, base coupling member 118 includes a base member coupling collar 124 which receives pivot pin 120 therethrough, a bottom wall 125 having a cable channel 126, and a pair of spaced-apart and opposed coupling flanges 128 and 132 with coupling openings 136 and 140. Housing coupling member 148 includes a cable channel 150 and coupling stubs 152 and 156 that extend into coupling openings 136 and 140 in coupling flanges 128 and 132, respectively, of base coupling member 118. Tension adjusting barrel 160 threadingly engages housing coupling member 148 at a threaded coupling 164 for adjusting the tension of derailleur cable 40 in a conventional manner. Tension adjusting barrel 160 includes a cable channel 168 for receiving derailleur cable 40 therethrough and a cable housing receiving opening 172 for receiving an end of cable housing 54 therein. A spring 173 is disposed between tension adjusting barrel 160 and housing coupling member 148 to provide friction between the two members and thereby prevent inadvertent rotation of tension adjusting barrel 160.

In this embodiment, cable channel 150 in housing coupling member 150 extends along an axis S (FIG. 1) that is substantially tangent to cable entraining groove 111 on pulley 108, and cable channel 88 in cable feed 84 extends along an axis T that is tangent to cable retaining groove 111 on pulley 108 and is oriented substantially perpendicular to pulley axis X. Thus, cable 40 makes a smooth transition as it proceeds from housing support 109, around cable entraining groove 111 and through cable feed 84.

FIG. 3 shows how housing coupling member 148 is attached to base coupling member 118. Base coupling member 118 is manufactured with coupling flange 132 inclined relative to coupling flange 128 as shown. Initially, coupling stub 152 is placed within coupling opening 136. Thereafter, coupling flange 132 is bent counterclockwise until coupling stub 156 is fitted within coupling opening 140. As a result, housing support 109 pivots around an axis Y that is coaxial with pivot pin 120, and housing support 109 also pivots around an axis Z that is coaxial with coupling stubs 152 and 156. From inspection it can be seen that axis Z extends in a direction substantially parallel to the pulley axis X, and axis Y extends in a direction substantially perpendicular to the pulley axis X. Thus, housing support 109 can deflect laterally by pivoting around axis Y in response to a lateral force, and housing support 109 can deflect around axis Z to accommodate rotation of derailleur 10 during operation. Since derailleur cable router 14 is formed with the derailleur base member 16, it is very compact. Also, the coupling between base coupling member 118 and base member 16 and the coupling between housing coupling member 148 and base coupling member 118 prevent dislocation of the housing support 109.

Figure 4:
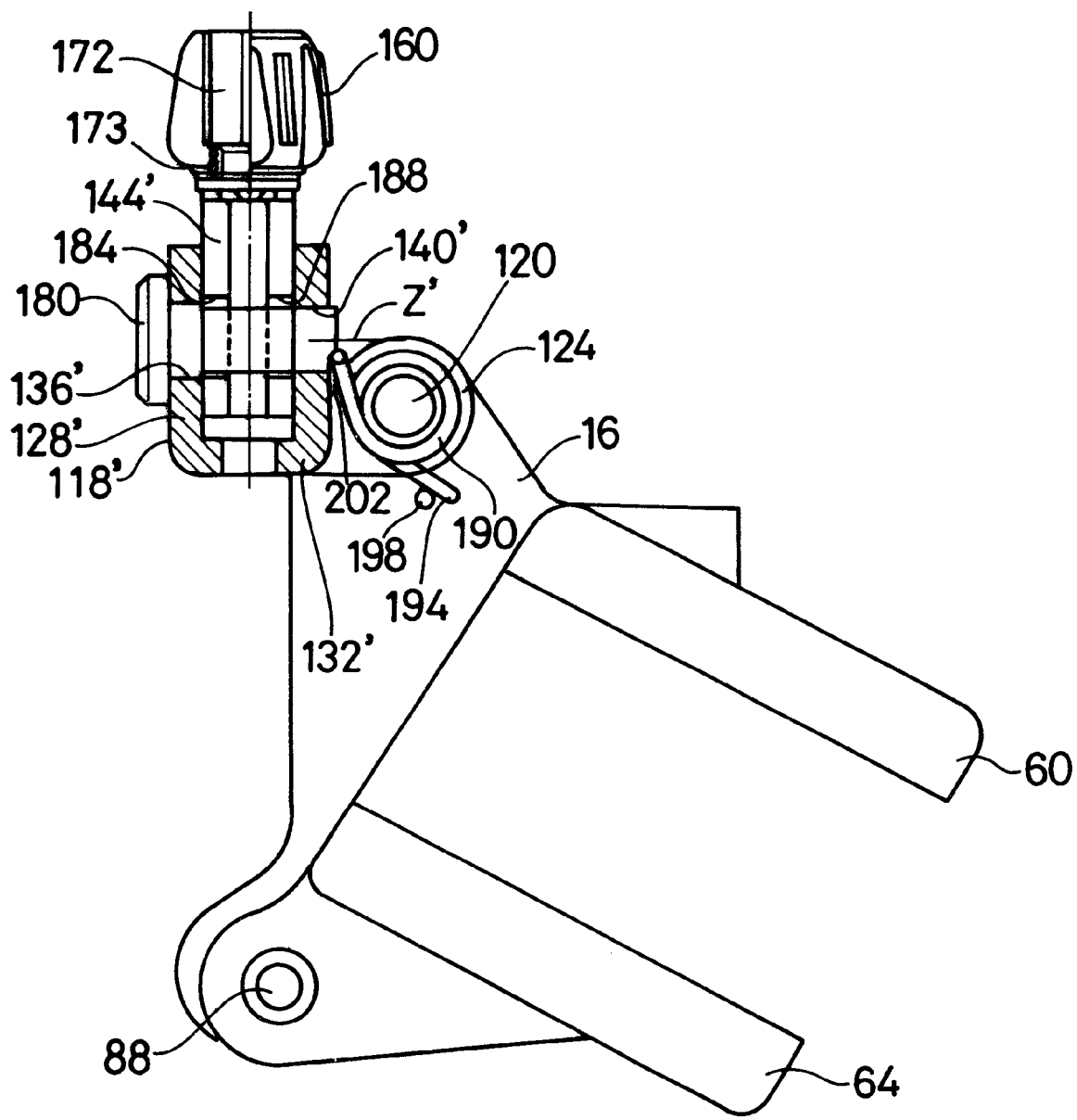
FIG. 4 is a partial cross-sectional view of an alternative embodiment of a housing coupling member and base coupling member according to the present invention.

FIG. 4 is a partial cross-sectional view of an alternative embodiment of a base coupling member 118' and a housing coupling member 144' according to the present invention. The remaining parts of the derailleur cable router remain the same. In this embodiment, base coupling member 118' has larger coupling openings 136' and 140' for receiving a coupling rivet 180 therethrough. Instead of the coupling stubs shown in FIGS. 2 and 3, housing coupling member 148' has coupling openings 184 and 188 for receiving coupling rivet 180 therethrough. In this embodiment there is no need to bend coupling flange 132' of base coupling member 118' during assembly. Instead, housing coupling member 148' is removably fitted between coupling flanges 128' and 132' and is pivotably supported by coupling rivet 180 for rotation around an axis Z' that is substantially parallel to the pulley axis X. A coil spring 190 has a first end 194 abutting against a spring stop 198 on base member 16 and a second end 202 abutting against base coupling member 118' for biasing base coupling member counterclockwise in FIG. 4. Of course, such a biasing spring also could be used in the embodiment shown in FIGS. 1–3.

While the above is a description of various embodiments of the present invention, further modifications may be employed without departing from the spirit and scope of the present invention. For example, the size, shape, location or orientation of the various components may be changed as desired. The functions of one element may be performed by two, and vice versa. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. A bicycle derailleur for use with a derailleur cable having a cable housing surrounding at least a portion of the derailleur cable, wherein the derailleur comprises:

a base member including a structure defining a threaded opening for mounting a derailleur cable router thereto, wherein the threaded opening is concentric with a mounting axis defined by a member that attaches the derailleur to a bicycle frame;

a movable member supporting a chain guide; and a coupling member for coupling the movable member to the base member so that the movable member moves relative to the base member.

2. The derailleur according to claim 1 wherein the base member includes a mounting opening for mounting the derailleur to a bicycle frame, wherein the mounting opening is concentric with the mounting axis.

3. The derailleur according to claim 2 further comprising a mounting bolt extending through the mounting opening, and wherein the threaded opening is disposed in the mounting bolt.

4. A bicycle derailleur for use with a derailleur cable having a cable housing surrounding at least a portion of the derailleur cable, wherein the derailleur comprises:

a base member having a mounting opening for mounting the derailleur to a bicycle frame, wherein the mounting opening defines a mounting axis;

a pulley mounted on the base member for rotation around a pulley axis, wherein the pulley axis is concentric with the mounting axis;

a movable member supporting a chain guide; and a coupling member for coupling the movable member to the base member so that the movable member moves relative to the base member.

5. The derailleur according to claim 4 further comprising a derailleur mounting bolt extending through the mounting opening for mounting the derailleur to the bicycle frame.

6. The derailleur according to claim 5 wherein the base member is rotatably supported by the derailleur mounting bolt.

7. The derailleur according to claim 6 further comprising a pulley mounting bolt rotatably mounting the pulley to the derailleur mounting bolt.

8. The derailleur according to claim 7 wherein the derailleur mounting bolt includes a threaded opening concentric with the mounting axis, and wherein the pulley mounting bolt is screwed into the threaded opening.

\* \* \* \* \*